United States Patent
Barthel et al.

(10) Patent No.: US 6,891,941 B1
(45) Date of Patent: May 10, 2005

(54) METHOD AND APPARATUS FOR INITIATING A TELECOMMUNICATIONS SERVICE

(75) Inventors: Tania Barthel, München (DE); Can Davutoglu, München (DE); Peter Moritz, Haar (DE); Thomas Pförtner, Höhenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/716,898

(22) Filed: Nov. 20, 2000

Related U.S. Application Data

(63) Continuation of application No. PCT/DE00/00828, filed on Mar. 17, 2000.

(30) Foreign Application Priority Data

Mar. 18, 1999 (DE) .......................................... 199 12 239

(51) Int. Cl.[7] .............................. H04M 3/42; H04M 7/00
(52) U.S. Cl. .............................. 379/201.01; 379/201.02; 379/207.02; 379/223
(58) Field of Search ........................... 379/201.01, 196, 379/207.02, 223, 201.02, 221.02

(56) References Cited

U.S. PATENT DOCUMENTS

| | | | | |
|---|---|---|---|---|
| 5,467,388 A | * | 11/1995 | Redd et al. ............ | 379/210.02 |
| 5,528,677 A | * | 6/1996 | Butler et al. ................ | 379/196 |
| 5,590,180 A | | 12/1996 | Tonomura et al. | |
| 5,915,008 A | * | 6/1999 | Dulman ................ | 379/221.08 |
| 5,933,490 A | * | 8/1999 | White et al. ........... | 379/221.01 |
| 6,044,142 A | * | 3/2000 | Hammarstrom et al. .... | 379/223 |
| 6,055,302 A | * | 4/2000 | Schmersel et al. ...... | 379/207.02 |
| 6,243,453 B1 | * | 6/2001 | Bunch et al. .......... | 379/201.02 |

OTHER PUBLICATIONS

Published International Application No. 98/09423 (Aström et al.), dated Mar. 5, 1998 XP–002146299, Draft ETSI EN 301 931–1, pp. 1–69.
"Introduction to Intelligent Network Capability Set 2", XP–002146300, International Telecommunication Union, , pp. 1–40.
"Distributed Functional Plane for Intelligent Network CS–1", ITU–T, Q. 1214, Oct. 1995, pp. 1–45.
"Enhancements for User Interaction", XP–002146298, Telecommunications Mar. 29 to Apr. 1, 1998, Conference Publication No. 451, pp. 235–239.

* cited by examiner

*Primary Examiner*—Bing Q. Bui
*Assistant Examiner*—Thjuan P Knowlin
(74) *Attorney, Agent, or Firm*—Laurence A. Greenberg; Werner H. Stemer; Ralph E. Locher

(57) ABSTRACT

A new method for initiating a telecommunication service is specified, which is independent of a call being set up after initiation by a service user. The application protocol (also called the IN Service Logic) is initiated by a so-called external trigger, or else a virtual trigger.

11 Claims, 2 Drawing Sheets

METHOD AND APPARATUS FOR INITIATING A TELECOMMUNICATIONS SERVICE

CROSS-REFERENCE TO RELATED APPLICATION

This is a continuation of copending International Application PCT/DE00/00828, filed Mar. 17, 2000, which designated the United States.

BACKGROUND OF THE INVENTION

Field of the Invention

The invention relates to a method for initiating a service in a telecommunications network.

The term telecommunications service or added-value service, also referred to for short as a service in the following text, is understood to cover, basic functions, such as transmissions in addition to the network functions offered. Known services are, for example, telephone numbers subject to special charges, standard telephone numbers, virtual private network (VPN) or universal personal telecommunications (UPT).

In public networks, these services (and service features) can be implemented in special centralized devices. Changes to existing services, and the introduction of new services, are thus carried out only at centralized control points.

A basic architecture has been standardized (standards range Q.1200 etc.) by the European Telecommunications Standards Institute (ETSI) and the International Telecommunications Union (ITU-T), as the so-called "Intelligent Network" or IN for short.

The hitherto-known way in which an IN service is called is described in the following text.

A connection request by a subscriber to use an IN service is initiated by dialing a service number, that is to say, for example, an IN prefix ("01") and the service identifier ("80"). An IN-compatible switching point (SSP, Service Switching Point) can identify the presence of an IN Service on the basis of the dialed digit sequence "0180" by comparison with the contents of a so-called trigger table which covers all the services. The contents of the trigger table are predefined and can be changed by the network operator. In this case, apart from the dialing of a (service) number, connection states (busy, no answer, off-hook) can also act as a trigger.

If the switching point is not IN-compatible, a connection to the IN switching point linked to it is set up by a predetermined route, and the rest of the handling of the call with the dialed digits is passed on as a parameter to the IN switching point.

The rest of the sequence is governed by a specific application protocol for each IN service identifier, which is selected using the trigger table. This application protocol, which runs in a service control point (SCP), controls the further handling of the call. The mechanist is also described in ITU-T Recommendation Q.1214.

SUMMARY OF THE INVENTION

It is accordingly an object of the invention to provide a method and an apparatus for initiating a telecommunications service that overcome the above-mentioned disadvantages of the prior art methods and devices of this general type, which is independent of a call being set up after initiation by a service user.

With the foregoing and other objects in view there is provided, in accordance with the invention, a method for implementing telecommunication services in a telecommunications network. The method includes the steps of initiating a telecommunication service due to an event which differs from a connection setting-up request from a subscriber; and carrying out actions defined for the telecommunication service.

An application program (also called the IN service logic) is initiated by a so-called external trigger or else a virtual trigger.

In contrast with the situation in the past, where initiation was performed by a trigger in a request to set up a connection, the service can now be initiated by an event which can be defined in any desired manner and can interact with the activating subscriber. Thus, after activation of the service, the subscriber need no longer himself set up a connection to the service control point by initiating a connection.

The novel method according to the invention allows more comprehensive telecommunication services than in the past. One example of a new service is described in detail in the exemplary embodiment further below. It is no longer necessary one of the service users or service providers to initiate the setting up of a connection in order to initiate the service. This is done when some other event which is being monitored occurs and/or is signaled.

The telecommunication service can be activated by the subscriber, so that the only subscribers who use the service are those who actually wish to do so or have the authorization to do so (for example those who have paid fees to do so).

It is also possible to specify additional parameters during the activation process, for example, telephone numbers which differ from those currently used, telephone numbers of other people, input formats, time details, conditions which inhibit initiation of the service, etc.

The service to be provided can thus be configured, in an even more flexible manner.

The service actions in this case may include the setting up of a connection:

a) between the activating subscriber and a second subscriber who may, for example, be the service provider, or b) to an automatic announcement unit in the network, or c) else to an associated call center.

In addition, the information can also be transmitted, for example, as an SMS, or in any other desired format.

Automatic transfer to a number of telephone numbers that can be reached can also be carried out simultaneously or successively. The setting up of a connection can also be initiated by a third party.

In one embodiment according to the invention, the service control point generates a "virtual telephone number" which is transmitted to the service provider. As soon as the event initiating the service occurs, the service provider thus simulates the setting up of a connection by attempting to set up a connection using the virtual telephone number. In the IN-compatible switching point (Service Switching Point), this "virtual telephone number" is, however, identified as a service call and is passed on to the service control point SCP, which has stored the required information such as the telephone numbers of the subscribers who are to be notified.

In accordance with an added feature of the invention, the subscriber activates the telecommunication service so that the telecommunication service receives and processes the event that will initiate it.

In accordance with an additional feature of the invention, there is the step of entering additional information during activation of the telecommunication service, and the additional information is taken into account during an initiation of the telecommunications service.

In accordance with another feature of the invention, the additional information contains telecommunications data relating to the subscriber, and leads to a transmission of further information to the subscriber during subsequent actions by the telecommunication service.

In accordance with a further feature of the invention, there is the step of setting up at least one communication link by the telecommunication service once the telecommunication service has been initiated.

In accordance with another added feature of the invention, once the telecommunication service has been initiated, at least one telecommunication subscriber receives a notification from a data service via the telecommunication service.

In accordance with another additional feature of the invention, there are the steps of generating a virtual telephone number via the telecommunication service after the telecommunication service is activated; and signaling the virtual telephone number to a service provider, the service provider in turn indicating an occurrence of the event.

In accordance with a further added feature of the invention, there is the step of using a switching point to transmit the virtual telephone number from the service provider to initiate the telecommunication service after the occurrence of the event.

In accordance with a further additional feature of the invention, there is the step of activating the telecommunication service simultaneously by more than one telecommunications subscriber.

In accordance with an added feature of the invention, after initiation of the telecommunication service, actions are carried out for all the telecommunications subscribers who have activated the telecommunication service.

With the foregoing and other objects in view there is further provided, in accordance with the invention, an apparatus for carrying out initiation of telecommunication services. The apparatus is formed of a first memory for storing a telecommunication service and a second memory for storing activation information relating to the telecommunication service. An execution unit is provided for carrying out the telecommunication service using the activation information and is connected to the first memory and the second memory. A receiving unit for receiving external events is provided. In which case, after receiving an event, the telecommunication service is carried out with an aid of the activation information, and the receiving unit is connected to the execution unit.

Other features which are considered as characteristic for the invention are set forth in the appended claims.

Although the invention is illustrated and described herein as embodied in a method and an apparatus for initiating a telecommunications service, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
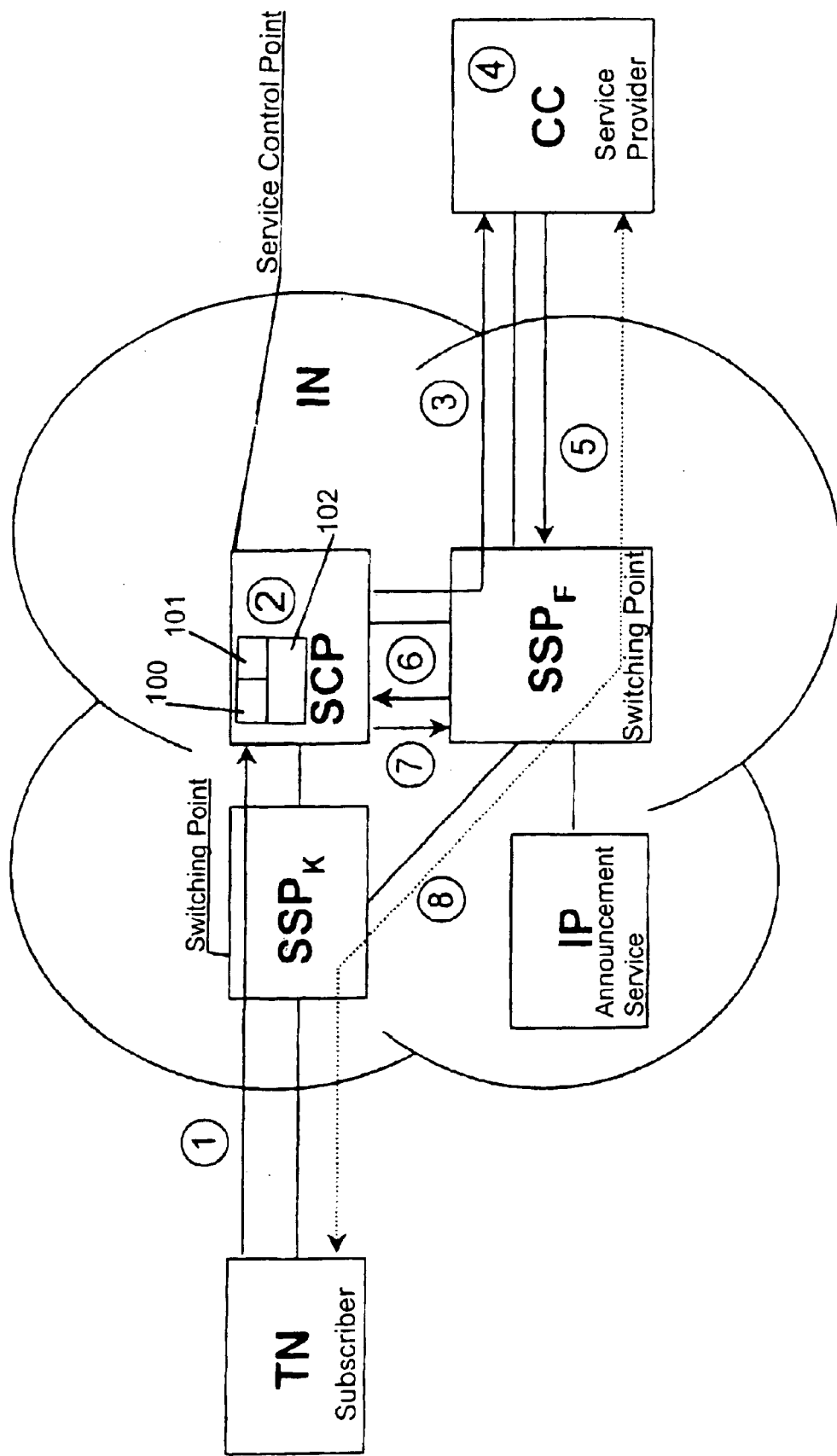
FIG. 1 is a block diagram of a method of operating in a telecommunications network according to the invention.

In all the figures of the drawing, sub-features and integral parts that correspond to one another bear the same reference symbol in each case. Referring now to the figures of the drawing in detail and first, particularly, to FIG. 1 thereof, there is shown a telecommunications network IN which has the capability to provide services offered on a centralized basis. An application program (a service logic) is installed in a first memory unit 100 of a service control point SCP. In a first step, a subscriber TN activates the service via the IN-compatible switching point $SSP_K$. The service control point SCP thus receives the information required for subsequent execution of the service, for example, the telephone number of the activating subscriber and, in addition, further telephone numbers, time details or the like, ①. The information is stored in a second memory unit 101 of the service control point SCP. It is noted that the first and second memory units 100, 101 can also be formed as one memory unit.

From the information received, the service control point SCP generates ② a "substitute trigger", that is to say, for example, a virtual telephone number as an initiation number.

This generated initiation number, possibly together with other information, is now passed on to a service provider or to some other suitable point, such as a call center CC, via an IN-compatible switching point $SSP_F$, ③.

If an external event now occurs, which differs from a request to set up a connection to the subscriber TN activating the service, and on the basis of which the service is intended to be initiated, ④, then this is registered by the service provider CC (call center) and the initiation number is sent to the IN-compatible switching point $SSP_F$, ⑤. The switching point $SSP_F$ identifies the initiation number as a service trigger and passes it on to the service control point SCP, in which the service has been activated, ⑥. After receiving the initiation number, an execution unit 102 of the service control point SCP interacts with the first memory unit 100 and executes the application program (i.e. service logic) which performs the communication service.

The service now converts the initiation number into a service call. In this case, all the registered subscribers for a service for whom this service is initiated after reception may be affected ⑦. The service control point SCP can now, for example, set up a connection between the subscriber TN and the service provider who has "initiated" the service, ⑧.

However, it is also possible for a connection to be set up between the subscriber TN and an announcement service IP in which an announcement, which may also possibly be matched to the known information is played back.

Figure 2:
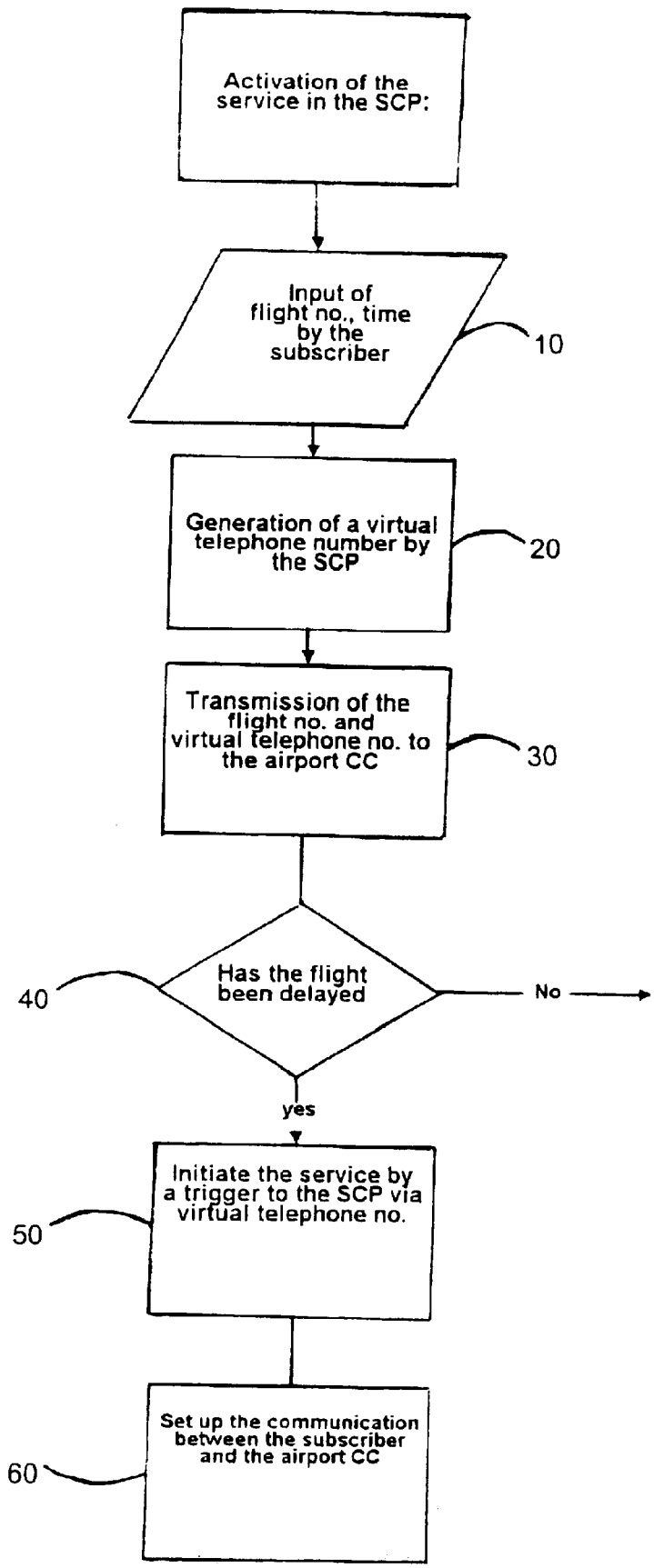
FIG. 2 is a flow chart of the method using the example of an information service for airline passengers.

One example of an advantageous use of the method according to the invention will be described in the following text relating to an information service for airline passengers who wish to be informed of delays. FIG. 2 shows a flowchart that illustrates the flight information service schematically.

An airline passenger activates the "Delay Notification Service" in the SCP, by entering the flight number, date and time and, optionally, further information such as the latest call time (callback by 1400 hrs). He must also enter the call destination (that is to say, for example, his telephone number) and, as an additional feature, the numbers of any other people to be informed, such as someone picking him up at the destination airport, see ① FIG. 1 and step 10.

The intelligent network IN transmits to the call center CC of the service provider, for example the airline company or the airport, the flight number and a virtual telephone number which is generated and is predetermined by the IN, see ②, ③ FIG. 1 and steps 20, 30, (which corresponds to the external trigger number) that is to say a "pointer" to this service.

In the event of a delay (that is to say a delay decision, ④ in FIG. 1 and step 40, =YES) to the flight, a trigger is sent directly from the call center of the service provider to the IN via the virtual trigger number, see ⑤, ⑥ of FIG. 1 and step 50. This transmission may be in the form of a voice link or a data link.

The notification service is activated and the virtual trigger number is converted to a number of airline passenger telephone numbers which can be reached and who have registered for this service.

In a first embodiment, the IN now sets up the connections between the relevant airline passengers and a respective free agent at the call center automatically in accordance with the predetermined settings, see ⑦, ⑧ FIG. 1 and step 60. The agent informs the airline passenger of the delay, and accepts any further customer requests.

However, alternatively, a connection can also be set up between the relevant airline passengers and an announcement facility in the IN (for example, the intelligent peripheral IP). An announcement is played back, configured in accordance with the details of the activation.

The advantage of this service for both parties is, clearly, the airline passenger avoids unnecessarily long waiting times at the airport, he can configure the service as required so that the information can be passed to any desired terminal (that is to say a telephone in the office, mobile terminal, etc.). This service is also convenient for people who are waiting for incoming flights. There is no need to check the actual arrival time, for example, using the video text or the Internet. Unnecessary waiting times are thus avoided.

The service provider is guaranteed simple handling, the connections to the airline passengers are set up automatically by the IN and there is no need to search any airline passenger databases, which may be out of date. At the same time, change requests from customers can be accepted and processed. In the second alternative of the automatic announcement text, there is no need for any operating personnel.

We claim:

1. A method for implementing telecommunication services in a telecommunications network, which comprises the steps of:
   initiating a telecommunication service to be triggered in response to an event which differs from a connection setting-up request from a subscriber;
   generating a virtual telephone number in a service control point after activating the telecommunication service;
   signaling the virtual telephone number to a service provider, the service provider in turn indicating an occurrence of the event;
   using a switching point to transmit the virtual telephone number from the service provider to initiate the telecommunication service after the occurrence of the event; and
   carrying out actions defined for the telecommunication service.

2. The method according to claim 1, wherein the subscriber activates the telecommunication service so that the telecommunication service receives and processes the event that will initiate it.

3. The method according to claim 2, which comprises entering additional information during activation of the telecommunication service, and the additional information is taken into account during an initiation of the telecommunications service.

4. The method according to claim 3, wherein the additional information contains telecommunications data relating to the subscriber, and leads to a transmission of further information to the subscriber during subsequent actions by the telecommunication service.

5. The method according to claim 1, which comprises setting up at least one communication link by the telecommunication service once the telecommunication service has been initiated.

6. The method according to claim 1, wherein once the telecommunication service has been initiated, at least one telecommunication subscriber receives a notification from a data service via the telecommunication service.

7. The method according to claim 1, which comprises activating the telecommunication service simultaneously by more than one telecommunications subscriber.

8. The method according to claim 7, wherein after initiation of the telecommunication service, actions are carried out for all the telecommunications subscribers who have activated the telecommunication service.

9. An apparatus for carrying out initiation of telecommunication services, comprising:
   first memory means for storing a telecommunication service;
   second memory means for storing activation information relating to the telecommunication service;
   execution means for carrying out the telecommunication service using the activation information and connected to said first memory means and said second memory means;
   means for generating a virtual telephone number via the telecommunication service after activating the telecommunication service;
   means for signaling the virtual telephone number to a service provider, the service provider in turn indicating an occurrence of an event;
   a switching point for transmitting the virtual telephone number from the service provider to initiate the telecommunication service after the occurrence of the event; and
   receiving means for receiving external events, in which case, after receiving an event, the telecommunication service is carried out with an aid of the activation information, said receiving means connected to said execution means.

10. An apparatus for carrying out initiation of telecommunication services, comprising:
   a first memory unit for storing a telecommunication service;
   a second memory unit for storing activation information relating to the telecommunication service;
   an execution unit for carrying out the telecommunication service using the activation information and connected to said first memory unit and said second memory unit;

a switching point for transmitting a virtual telephone number from a service provider to initiate the telecommunication service after an occurrence of an event; and a receiving unit for receiving external events, in which case, after receiving the event, the telecommunication service is carried out with an aid of the activation information, said receiving unit connected to said execution unit.

11. A method for implementing telecommunication services in a telecommunications network, which comprises the steps of:

activating a telecommunication service;

generating a virtual telephone number in a service control point after activating the telecommunication service;

signaling the virtual telephone number to a service provider, the service provider in turn indicating an occurrence of an event for triggering the telecommunication service, the event differing from a connection setting-up request from a subscriber;

using a switching point to transmit the virtual telephone number from the service provider to initiate the telecommunication service after the occurrence of the event; and carrying out actions defined for the telecommunication service.

* * * * *